US012684508B2

(12) United States Patent
Li

(10) Patent No.: US 12,684,508 B2
(45) Date of Patent: Jul. 14, 2026

(54) SYNCHRONIZATION METHOD, VEHICLE-TO-EVERYTHING TERMINAL, AND STORAGE MEDIUM

(71) Applicant: TCL COMMUNICATION (NINGBO) CO., LTD., Ningbo (CN)

(72) Inventor: Zhiyuan Li, Ningbo (CN)

(73) Assignee: TCL COMMUNICATION (NINGBO) CO., LTD., Ningbo (CN)

( * ) Notice: Subject to any disclaimer, the term of this patent is extended or adjusted under 35 U.S.C. 154(b) by 604 days.

(21) Appl. No.: 18/250,547

(22) PCT Filed: Dec. 7, 2020

(86) PCT No.: PCT/CN2020/134361
§ 371 (c)(1),
(2) Date: Nov. 14, 2023

(87) PCT Pub. No.: WO2022/088394
PCT Pub. Date: May 5, 2022

(65) Prior Publication Data
US 2024/0121735 A1      Apr. 11, 2024

(30) Foreign Application Priority Data
Oct. 27, 2020    (CN) .......................... 202011162180.5

(51) Int. Cl.
*H04W 56/00* (2009.01)
(52) U.S. Cl.
CPC ... *H04W 56/0035* (2013.01); *H04W 56/0015* (2013.01)

(58) Field of Classification Search
CPC ......... H04W 56/0035; H04W 56/0015; H04W 56/001; H04W 4/40; H04L 5/0048;
(Continued)

(56) References Cited

U.S. PATENT DOCUMENTS

2017/0280406 A1    9/2017   Sheng
2017/0289934 A1    10/2017  Sheng et al.
(Continued)

FOREIGN PATENT DOCUMENTS

CA        3023879 A1    11/2017
CN        107046461 A    8/2017
(Continued)

OTHER PUBLICATIONS

WO_2020001188_A1 (Year: 2020).*
(Continued)

*Primary Examiner* — Rushil P. Sampat
(74) *Attorney, Agent, or Firm* — PV IP PC; Wei Te Chung

(57) ABSTRACT

The present application discloses a synchronization method, a vehicle-to-everything terminal, and a storage medium. The method is applied to the vehicle-to-everything terminal and includes: detecting a synchronization signal; when at least one SLSS synchronization signal is detected, obtaining a GNSS synchronization signal; respectively performing synchronization error detection on the at least one SLSS synchronization signal and the GNSS synchronization signal to determine an optimal synchronization signal; and performing synchronization according to the optimal synchronization signal.

11 Claims, 5 Drawing Sheets

(58) Field of Classification Search
CPC ..... H04L 5/001; H04L 5/0053; H04L 5/0007; H04L 5/0098; H04B 17/318
See application file for complete search history.

(56) References Cited

U.S. PATENT DOCUMENTS

| | | | |
|---|---|---|---|
| 2018/0139714 A1* | 5/2018 | Li | ........................ H04W 72/02 |
| 2018/0352525 A1* | 12/2018 | Li | ....................... H04W 56/004 |
| 2019/0159150 A1 | 5/2019 | Nguyen et al. | |
| 2019/0200309 A1* | 6/2019 | Zeng | .................... H04W 76/14 |
| 2021/0274457 A1* | 9/2021 | Zhao | .................... H04L 5/0048 |
| 2021/0368458 A1* | 11/2021 | Zhao | .................... G01S 19/256 |

FOREIGN PATENT DOCUMENTS

| | | |
|---|---|---|
| CN | 107295625 A | 10/2017 |
| CN | 107852690 A | 3/2018 |
| CN | 108029084 A | 5/2018 |
| CN | 109586879 A | 4/2019 |
| CN | 109804678 A | 5/2019 |
| CN | 110352618 A | 10/2019 |
| CN | 110730496 A | 1/2020 |
| CN | 110972106 A | 4/2020 |
| CN | 111587547 A | 8/2020 |
| EP | 3337253 A1 | 6/2018 |
| WO | 2017123047 A1 | 7/2017 |

OTHER PUBLICATIONS

Written Opinion of the International Search Authority in international application No. PCT/CN2020/134361, mailed on Jul. 26, 2021.
International Search Report in International application No. PCT/CN2020/134361, mailed on Jul. 26, 2021.
TCL Communication, "Sidelink synchronization mechanism", 3GPP TSG RAN WG1 #99 Meeting R1-1912242, Nov. 8, 2019, 1-20.
Chinese Office Action issued in corresponding Chinese Patent Application No. 202011162180.5 dated May 31, 2021, pp. 1-9.
Notification to Grant Patent Right for Invention issued in corresponding Chinese Patent Application No. 202011162180.5 dated Nov. 24, 2021, pp. 1-5.
<3GPP TSG RAN WG1 Meeting #95> Huawei, HiSilicon Sidelink synchronization mechanisms for NR V2X dated Nov. 2, 2018.

* cited by examiner

300

SYNCHRONIZATION METHOD, VEHICLE-TO-EVERYTHING TERMINAL, AND STORAGE MEDIUM

CROSS REFERENCE TO RELATED APPLICATIONS

This application is a US national phase application based upon an International Application No. PCT/CN2020/134361, filed on Dec. 7, 2020, which claims the priority of the Chinese Patent Application No. 202011162180.5, filed on Oct. 27, 2020, and entitled "SYNCHRONIZATION METHOD AND DEVICE AND STORAGE MEDIUM". The entire disclosures of the above application are incorporated herein by reference.

FIELD OF THE DISCLOSURE

The present application relates to the technical field of communications, and more particularly, to a synchronization method, a vehicle-to-everything terminal, and a storage medium.

BACKGROUND

Vehicle to X (V2X) is an important application scenario in 5G. V2X adopts SideLink (edge connection) technology in ProSe (short-range communication) technology to realize direct communication between vehicle network terminals. SideLink is based on 5G air interface NR technology (NR V2X), which meets low-latency, high-reliability, and high-speed standards required by V2X.

NR has high requirements for time-frequency offset synchronization, that is, frequency, phase, and time-domain synchronization are required, and all three types of synchronization must rely on time-domain synchronization. In the SideLink synchronization scenario, the vehicle-to-everything terminal directly connected to a base station receives a synchronization signal sent by the base station for synchronization. The vehicle-to-everything terminals that are not directly connected to the base station are synchronized according to SLSS signals sent by other vehicle-to-everything terminals. If the vehicle-to-everything terminal is synchronized in this chain, a cumulative error of the chain may be enlarged, thereby reducing accuracy of the synchronization of the vehicle-to-everything terminal.

SUMMARY

Technical Problem

Embodiments of the present application provide a synchronization method, a vehicle-to-everything terminal, and a storage medium, which can reduce synchronization errors of the vehicle-to-everything terminal and improve synchronization accuracy.

Technical Solution

In a first aspect, an embodiment of the present application provides a synchronization method applied to a vehicle-to-everything terminal, comprising: detecting a synchronization signal;

when at least one SLSS synchronization signal is detected, obtaining a GNSS synchronization signal;

respectively performing synchronization error detection on the at least one SLSS synchronization signal and the GNSS synchronization signal to determine an optimal synchronization signal; and performing synchronization according to the optimal synchronization signal.

In some embodiments of the present application, respectively performing synchronization error detection on the at least one SLSS synchronization signal and the GNSS synchronization signal to determine the optimal synchronization signal further comprises:

selecting an optimal SLSS synchronization signal from the at least one SLSS synchronization signal; and respectively performing synchronization error detection on the optimal SLSS synchronization signal and the GNSS synchronization signal to determine the optimal synchronization signal.

In some embodiments of the present application, selecting the optimal SLSS synchronization signal from the at least one SLSS synchronization signal further comprises:

selecting SLSS synchronization signals with a highest priority from the at least one SLSS synchronization signal; and selecting an SLSS synchronization signal with a highest signal strength from the SLSS synchronization signals with the highest priority as the optimal SLSS synchronization signal.

In some embodiments of the present application, respectively performing synchronization error detection on the optimal SLSS synchronization signal and the GNSS synchronization signal to determine the optimal synchronization signal further comprises:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result.

In some embodiments of the present application, detecting the time domain positions of the two synchronization errors to determine the optimal synchronization signal according to the detection result further comprises:

detecting whether a time domain position of a minimum synchronization error between the two synchronization errors is located in an interference-free area of a cyclic prefix of a signal sent by the vehicle-to-everything terminal;

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

In some embodiments of the present application, the synchronization method further comprises:

calibrating a crystal oscillator of the vehicle-to-everything terminal according to the optimal synchronization signal.

In some embodiments of the present application, the synchronization method further comprises:

when a PSS/SSS synchronization signal is detected, performing synchronization according to the PSS/SSS synchronization signal; and calibrating the crystal oscillator of the vehicle-to-everything terminal according to the PSS/SSS synchronization signal.

In some embodiments of the present application, the synchronization method further comprises:

when the synchronization signal is not detected, the crystal oscillator of the vehicle-to-everything terminal is used as a synchronization source to perform synchronization.

In a second aspect, an embodiment of the present application provides a synchronization device applied to a vehicle-to-everything terminal, comprising:

a detector configured to detect a synchronization signal;

an obtainer configured to when at least one SLSS synchronization signal is detected, obtain a GNSS synchronization signal;

a determiner configured to respectively perform synchronization error detection on the at least one SLSS synchronization signal and the GNSS synchronization signal to determine an optimal synchronization signal; and a synchronizer configured to perform synchronization according to the optimal synchronization signal.

In a third aspect, an embodiment of the present application provides a computer-readable storage medium, wherein a plurality of instructions are stored in the computer-readable storage medium, and the instructions are configured to be loaded by a processor to perform the following steps:

detecting a synchronization signal;

when at least one SLSS synchronization signal is detected, obtaining a GNSS synchronization signal;

respectively performing synchronization error detection on the at least one SLSS synchronization signal and the GNSS synchronization signal to determine an optimal synchronization signal; and performing synchronization according to the optimal synchronization signal.

In some embodiments of the present application, the processor respectively performing synchronization error detection on the at least one SLSS synchronization signal and the GNSS synchronization signal to determine the optimal synchronization signal further comprises the following steps:

selecting an optimal SLSS synchronization signal from the at least one SLSS synchronization signal; and respectively performing synchronization error detection on the optimal SLSS synchronization signal and the GNSS synchronization signal to determine the optimal synchronization signal.

In some embodiments of the present application, the processor selecting the optimal SLSS synchronization signal from the at least one SLSS synchronization signal further comprises the following steps:

selecting SLSS synchronization signals with a highest priority from the at least one SLSS synchronization signal; and selecting an SLSS synchronization signal with a highest signal strength from the SLSS synchronization signals with the highest priority as the optimal SLSS synchronization signal.

In some embodiments of the present application, the processor respectively performing synchronization error detection on the optimal SLSS synchronization signal and the GNSS synchronization signal to determine the optimal synchronization signal further comprises the following steps:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result.

In some embodiments of the present application, the processor detecting the time domain positions of the two synchronization errors to determine the optimal synchronization signal according to the detection result further comprises the following steps:

detecting whether a time domain position of a minimum synchronization error between the two synchronization errors is located in an interference-free area of a cyclic prefix of a signal sent by the vehicle-to-everything terminal;

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

In some embodiments of the present application, the processor further performs the following steps:

calibrating a crystal oscillator of the vehicle-to-everything terminal according to the optimal synchronization signal.

In some embodiments of the present application, the processor further performs the following steps:

when a PSS/SSS synchronization signal is detected, performing synchronization according to the PSS/SSS synchronization signal; and calibrating the crystal oscillator of the vehicle-to-everything terminal according to the PSS/SSS synchronization signal.

In some embodiments of the present application, the processor further performs the following steps:

when the synchronization signal is not detected, the crystal oscillator of the vehicle-to-everything terminal is used as a synchronization source to perform synchronization.

In a fourth aspect, the present application also provides a vehicle-to-everything terminal, comprising a processor and a memory, wherein the processor is electrically connected to the memory, the memory is used to store instructions and data, and the processor is used to perform the following steps:

detecting a synchronization signal;

when at least one SLSS synchronization signal is detected, obtaining a GNSS synchronization signal;

respectively performing synchronization error detection on the at least one SLSS synchronization signal and the GNSS synchronization signal to determine an optimal synchronization signal; and performing synchronization according to the optimal synchronization signal.

In some embodiments of the present application, the processor respectively performing synchronization error detection on the at least one SLSS synchronization signal and the GNSS synchronization signal to determine the optimal synchronization signal further comprises the following steps:

selecting an optimal SLSS synchronization signal from the at least one SLSS synchronization signal; and respectively performing synchronization error detection on the optimal SLSS synchronization signal and the GNSS synchronization signal to determine the optimal synchronization signal.

In some embodiments of the present application, the processor respectively performing synchronization error detection on the optimal SLSS synchronization signal and the GNSS synchronization signal to determine the optimal synchronization signal further comprises the following steps:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result.

In some embodiments of the present application, the processor detecting the time domain positions of the two synchronization errors to determine the optimal synchronization signal according to the detection result further comprises the following steps:

detecting whether a time domain position of a minimum synchronization error between the two synchronization errors is located in an interference-free area of a cyclic prefix of a signal sent by the vehicle-to-everything terminal;

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

Beneficial Effect

The synchronization method, the vehicle-to-everything terminal, and the storage medium provided in the present application can acquire the GNSS synchronization signal when the vehicle-to-everything terminal detects at least one SLSS synchronization signal and can perform synchronization error detection on the optimal SLSS synchronization signal and the GNSS synchronization signal respectively, so as to determine the optimal synchronization signal. Synchronize according to the optimal synchronization signal to avoid accumulating synchronization errors, thereby reducing synchronization errors and improving synchronization accuracy.

BRIEF DESCRIPTION OF THE DRAWINGS

The technical solutions and other beneficial effects of the present application will be apparent through the detailed description of the specific embodiments of the present application below in conjunction with the accompanying drawings.

DETAILED DESCRIPTION

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application.

Figure 1:
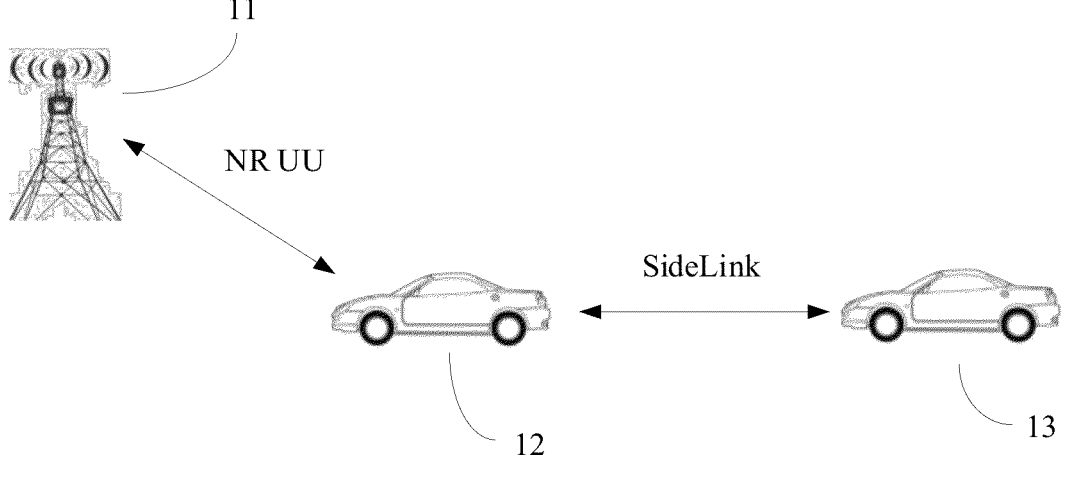
FIG. 1 is a schematic structural diagram of a vehicle-to-everything system provided by an embodiment of the present application.

As shown in FIG. 1, FIG. 1 is a schematic structural diagram of a vehicle-to-everything system. Due to the different network coverage, the environment of the vehicle-to-everything can be divided into three cases. That is, network coverage area, no network coverage area, and partial network coverage area. SideLink's PC5 interface works in all three cases. However, the NR UU interface does not have a connection in an area without network coverage, and may not exist in a part of the network coverage area. Therefore, as shown in FIG. 1, the vehicle-to-everything terminal 12 is located in the network coverage area, and a base station (qNodeB) 11 is connected to the vehicle-to-everything terminal 12 through the NR UU. The vehicle-to-everything terminal 13 is located in an area without network coverage, the base station 11 and the vehicle-to-everything terminal 13 cannot be connected, and the vehicle network terminal 12 can be connected with the vehicle-to-everything terminal 13 through SideLink.

Figure 2:
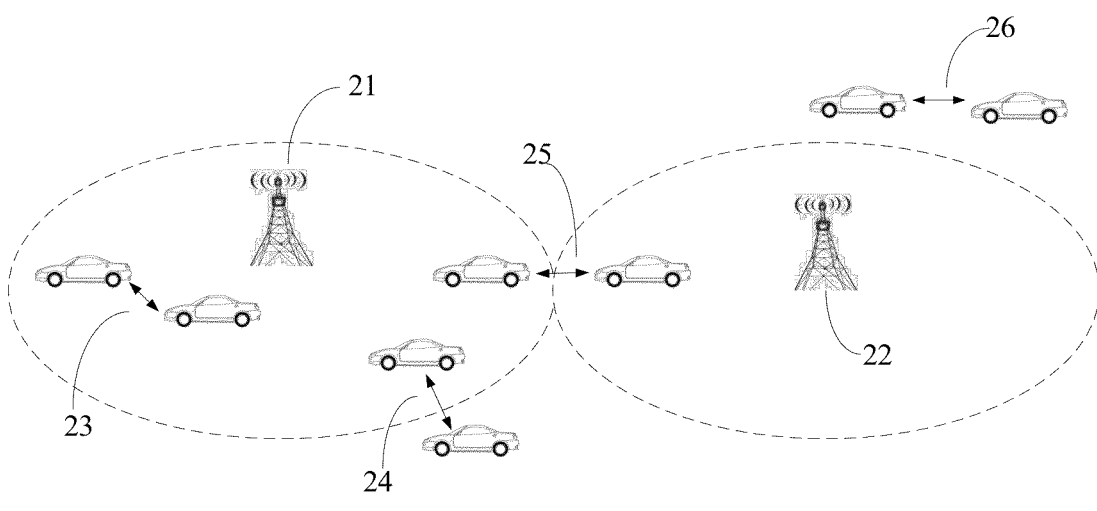
FIG. 2 is another schematic structural diagram of a vehicle-to-everything system provided by the embodiment of the present application.

The direct communication between two vehicle-to-everything terminals makes these two vehicle-to-everything terminals form a group of D2D (device to device) terminals. As shown in FIG. 2, in the D2D terminals 23, two vehicle-to-everything terminals are located within the coverage of the base station 21. In the D2D terminals 24, one vehicle-to-everything terminal is located within the coverage of the base station 21, and the other vehicle-to-everything terminal is located outside the coverage of the base station. In the D2D terminals 25, one vehicle-to-everything terminal is located within the coverage area of the base station 21, and the other vehicle-to-everything terminal is located within the coverage area of the base station 22. In the D2D terminals 26, the other vehicle-to-everything terminals are located outside the coverage of the base station.

Figure 3:
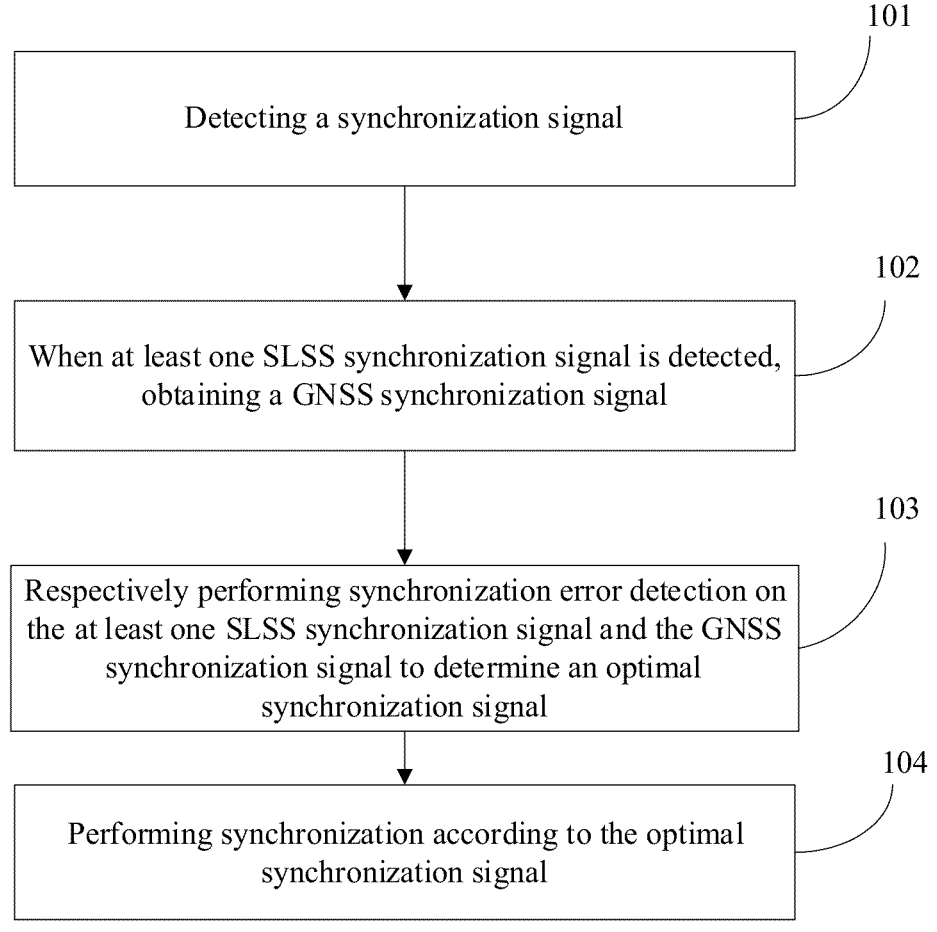
FIG. 3 is a schematic flowchart of a synchronization method provided by an embodiment of the present application.

As shown in FIG. 3, FIG. 3 is a schematic flowchart diagram of a synchronization method provided in an embodiment of the present application. The synchronization method is applied to a vehicle-to-everything terminal. The specific flowchart of the synchronization method can be as follows:

Operation 101: Detecting a synchronization signal.

In the embodiment of the present application, the vehicle-to-everything terminal detects the synchronization signals around it. If the vehicle-to-everything terminal is located within the coverage of the base station, the vehicle-to-everything terminal can detect the synchronization signal sent by the base station. The synchronization signal sent by the base station is PSS (primary synchronization signal) or SSS (secondary synchronization signal). For example, the two vehicle-to-everything terminals constituting the D2D terminal 23 in FIG. 2 can both detect the PSS/SSS synchronization signal sent by the base station 21. In the D2D terminals 25, the vehicle-to-everything terminals located within the coverage of the base station 21 can detect the PSS/SSS synchronization signal sent by the base station 21. The vehicle-to-everything terminals located within the coverage of the base station 22 can detect the PSS/SSS synchronization signal sent by the base station 22.

If the vehicle-to-everything terminal is located outside the coverage of the base station and the vehicle-to-everything terminal can detect a synchronization signal, the synchronization signal detected by the vehicle-to-everything terminal is the SLSS (SideLink synchronization signal) sent by other vehicle-to-everything terminals. For example, in the D2D terminals 24 in FIG. 2, a vehicle-to-everything terminal located outside the coverage of the base station may detect the SLSS synchronization signal sent by another vehicle-to-everything terminal. In addition, the vehicle-to-everything terminals located outside the coverage of the base station may not detect any synchronization signal, for example, the two vehicle-to-everything terminals constituting the D2D terminal 26 in FIG. 2.

The PSS/SSS synchronization signal sent by the base station has the highest priority and can be set to 0. The method further includes when a PSS/SSS synchronization signal is detected, performing synchronization according to the PSS/SSS synchronization signal. Calibrate the crystal oscillator of the vehicle-to-everything terminal according to the PSS/SSS synchronization signal.

It should be noted that, if the vehicle-to-everything terminal detects the PSS/SSS synchronization signal sent by the base station, it may directly perform clock synchronization according to the PSS/SSS synchronization signal. That is to say, the base station is used as a synchronization source. In addition, the vehicle-to-everything terminal calibrates its own crystal oscillator according to the PSS/SSS synchronization signal, so as to avoid any subsequent failure to detect any synchronization signal, the crystal oscillator can be used as a synchronization source to reduce synchronization errors.

In addition, the vehicle-to-everything terminal sends the SLSS synchronization signal to the outside and sets the priority of the SLSS synchronization signal as 1. The higher the value of the priority, the lower the priority. That is, the priority of the SLSS synchronization signal is lower than that of the PSS/SSS synchronization signal. If the highest priority of the synchronization signals that can be detected by other vehicle-to-everything terminals is 1, then the priority of the SLSS synchronization signals sent by other vehicle-to-everything terminals is set to 2, and so on. If the highest priority among the synchronization signals that can be detected by a vehicle-to-everything terminal A is n, then the priority of the SLSS synchronization signal sent by the vehicle-to-everything terminal A is set to n+1, where n>0.

Operation 102: When at least one SLSS synchronization signal is detected, obtaining a GNSS synchronization signal.

In the embodiment of the present application, the vehicle-to-everything terminal does not detect the PSS/SSS synchronization signal sent by the base station, but only detects the SLSS synchronization signal sent by other vehicle-to-everything terminals. In order to avoid the priority value of the SLSS synchronization signal being too large, that is, the priority is too low, and the synchronization accumulation error is too large, so the GNSS (global satellite navigation system) synchronization signal is introduced.

The GNSS module of the vehicle-to-everything terminal can receive the synchronization signal sent by GNSS, that is, the GNSS synchronization signal. That is to say, when the vehicle-to-everything terminal cannot be directly synchronized with the base station, the GNSS synchronization signal is used to select the optimal synchronization signal of the vehicle-to-everything terminal to reduce the synchronization error of the vehicle-to-everything terminal.

Operation 103: Respectively performing synchronization error detection on the at least one SLSS synchronization signal and the GNSS synchronization signal to determine an optimal synchronization signal.

In the embodiment of the present application, the vehicle-to-everything terminal compares and detects the SLSS synchronization signal received from other vehicle-to-everything terminals with the GNSS synchronization signal obtained from the GNSS. In order to improve the comparison detection efficiency and further improve the processing speed, an optimal SLSS synchronization signal can be selected from the received SLSS synchronization signals, and then compared with the GNSS synchronization signal for detection.

Specifically, in operation 103, respectively performing synchronization error detection on the at least one SLSS synchronization signal and the GNSS synchronization signal to determine the optimal synchronization signal further comprises:

selecting an optimal SLSS synchronization signal from the at least one SLSS synchronization signal;

respectively performing synchronization error detection on the optimal SLSS synchronization signal and the GNSS synchronization signal to determine the optimal synchronization signal.

The optimal SLSS synchronization signal can be considered from two aspects of priority and signal strength. Specifically, selecting the optimal SLSS synchronization signal from the at least one SLSS synchronization signal further comprises:

selecting SLSS synchronization signals with a highest priority from the at least one SLSS synchronization signal; and selecting an SLSS synchronization signal with a highest signal strength from the SLSS synchronization signals with the highest priority as the optimal SLSS synchronization signal.

It should be noted that after receiving the SLSS synchronization signals sent by other vehicle-to-everything terminals, the vehicle-to-everything terminal can identify the priority value corresponding to the SLSS synchronization signal and select the smallest priority value from all the received SLSS synchronization signals (i.e., priority highest level) SLSS synchronization signal. If only one SLSS synchronization signal with the smallest priority value is selected, the SLSS synchronization signal is used as the optimal SLSS synchronization signal. If there are still multiple selected SLSS synchronization signals with the smallest priority value, then continue to compare the signal strengths of the selected multiple SLSS synchronization signals, so as to select the SLSS signal with the highest signal strength as the optimal SLSS synchronization signal.

After the optimal SLSS synchronization signal is selected, the optimal SLSS synchronization signal is compared with the GNSS synchronization signal to give priority to the synchronization signal with a small synchronization error. Specifically, respectively performing synchronization error detection on the optimal SLSS synchronization signal and the GNSS synchronization signal to determine the optimal synchronization signal further comprises:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result.

It should be noted that the vehicle-to-everything terminal calculates the difference between the clock corresponding to the optimal SLSS synchronization signal and its own synchronization clock to obtain the SLSS synchronization error. In addition, the vehicle-to-everything terminal calculates the difference between the GPS timing corresponding to the GNSS synchronization signal and its own synchronization clock to obtain the GNSS synchronization error. Compare the size of the SLSS synchronization error and the GNSS synchronization error and give priority to the synchronization error with a small value.

Specifically, detecting the time domain positions of the two synchronization errors to determine the optimal synchronization signal according to the detection result further comprises:

detecting whether a time domain position of a minimum synchronization error between the two synchronization errors is located in an interference-free area of a cyclic prefix of a signal sent by the vehicle-to-everything terminal;

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

Figure 4:
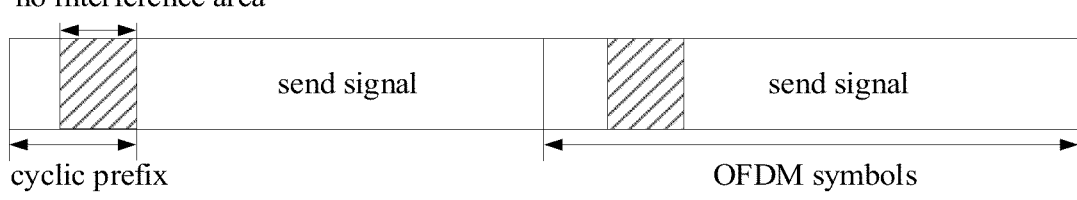
FIG. 4 is a schematic diagram of a cyclic prefix of a signal sent by a vehicle-to-everything terminal in a synchronization method provided by an embodiment of the present application.

It should be noted that when the vehicle-to-everything terminal sends a signal, it may set a cyclic prefix in the OFDM symbol. Some positions in the cyclic prefix are no ISIS (inter-symbol interference) areas, that is, interference-free areas, as shown in FIG. 4. This interference-free area is an error-tolerant area. If the time domain position of the synchronization error falls into the interference-free area, it is quasi-time synchronization, and may not affect the sending and receiving of the vehicle-to-everything terminal. If the time-domain position of the synchronization error falls outside the interference-free area of the cyclic prefix, it is invalid timing synchronization and directly causes inter-symbol interference. Therefore, after calculating the synchronization errors of the two synchronization signals, it is necessary to detect the time-domain position of the synchronization errors, and it is preferable to detect the synchronization errors with a small value.

For example, if the SLSS synchronization error is smaller than the GNSS synchronization error, it is preferentially detected whether the time domain position of the SLSS synchronization error is located in the interference-free area. If yes, the optimal SLSS synchronization signal is used as the optimal synchronization signal of the vehicle-to-everything terminal, and there is no need to detect GNSS synchronization errors. If not, continue to detect whether the time-domain position of the GNSS synchronization error is located in the interference-free area. If yes, the GNSS synchronization signal is used as the optimal synchronization signal for the vehicle-to-everything terminal. If not, the synchronization fails, and the vehicle-to-everything terminal remains unchanged.

Operation 104: Performing synchronization according to the optimal synchronization signal.

In the embodiment of the present application, synchronizing according to the optimal synchronization signal means that the vehicle-to-everything terminal adjusts its own synchronization clock to be consistent with the clock corresponding to the optimal synchronization signal.

After the vehicle-to-everything terminal is synchronized, the method further includes:

calibrating a crystal oscillator of the vehicle-to-everything terminal according to the optimal synchronization signal.

It should be noted that if the vehicle-to-everything terminal has not received the PSS/SSS synchronization signal sent by the base station before, that is, the crystal oscillator of the vehicle-to-everything terminal has not been calibrated according to the PSS/SSS synchronization signal before, the current vehicle-to-everything terminal can be based on the optimal synchronization signal to calibrate the crystal oscillator. If the crystal oscillator of the vehicle-to-everything terminal has been calibrated according to the PSS/SSS synchronization signal before, there is no need to calibrate the crystal oscillator at present, so that the vehicle-to-everything terminal can use the crystal oscillator as a synchronization source when no synchronization signal can be detected in the future, to reduce the synchronization error.

Further, the method also includes:

When the synchronization signal is not detected, the crystal oscillator of the vehicle-to-everything terminal is used as a synchronization source for synchronization.

It should be noted that the crystal oscillator of the vehicle-to-everything terminal is calibrated when there is a high-priority synchronization signal as much as possible, so that when the vehicle-to-everything terminal does not detect any synchronization signal, it can use its own crystal oscillator as a synchronization source for synchronization, so as to reduce the synchronization error as much as possible.

It can be seen from the above that the synchronization method provided by the present application can acquire the GNSS synchronization signal when the vehicle-to-everything terminal detects at least one SLSS synchronization signal, and the vehicle-to-everything terminal performs synchronization error detection on at least one SLSS synchronization signal and GNSS synchronization signal respectively, so as to determine an optimal synchronization signal, to synchronize according to the optimal synchronization signal to avoid accumulating synchronization errors, thereby reducing the synchronization error and improving the synchronization accuracy.

Figure 5:
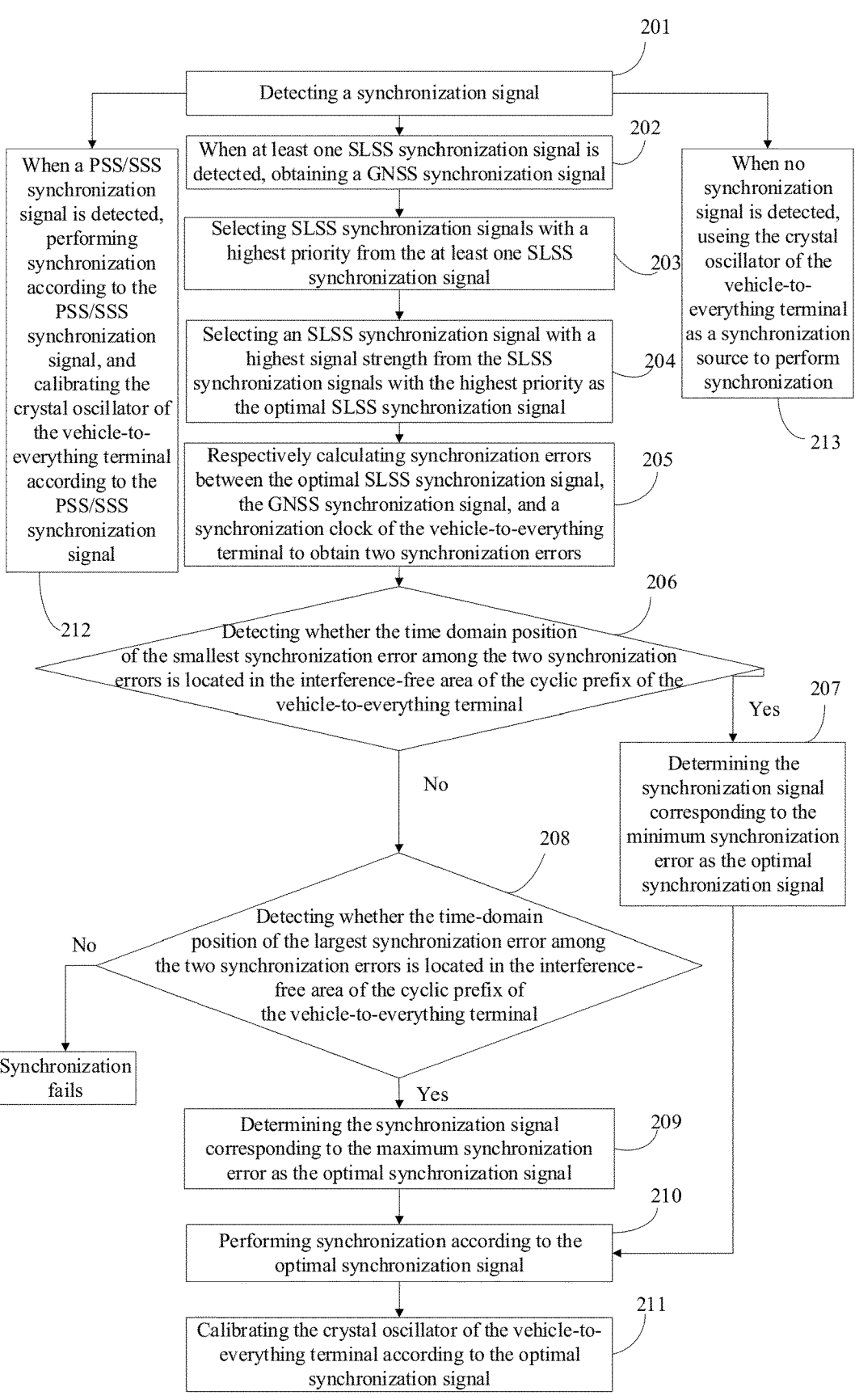
FIG. 5 is another schematic flowchart of a synchronization method provided by an embodiment of the present application.

As shown in FIG. 5, FIG. 5 is another schematic flowchart of the synchronization method provided by the embodiment of the present application. The synchronization method is applied to the vehicle-to-everything terminal, and the specific process of the synchronization method can be as follows:

Operation 201: Detecting a synchronization signal.

For example, a vehicle-to-everything terminal A detects all synchronization signals around.

Operation 202: When at least one SLSS synchronization signal is detected, obtaining a GNSS synchronization signal.

For example, the vehicle-to-everything terminal A does not detect the PSS/SSS synchronization signal sent by the base station, but only detects the SLSS synchronization signal sent by the vehicle-to-everything terminal B, the vehicle-to-everything terminal C, and the vehicle-to-everything terminal D, it can obtain the GNSS synchronization signal sent by GNSS.

Operation 203: Selecting SLSS synchronization signals with a highest priority from the at least one SLSS synchronization signal.

For example, in the SLSS synchronization signals detected by the vehicle-to-everything terminal A, the priority of the SLSS synchronization signals sent by the vehicle-to-everything terminals B and C is 1, and the priority of the SLSS synchronization signal sent by the vehicle-to-everything terminal D is 2, then select the SLSS synchronization signal sent by vehicle-to-everything terminals B and C.

Operation 204: Selecting an SLSS synchronization signal with a highest signal strength from the SLSS synchronization signals with the highest priority as the optimal SLSS synchronization signal.

For example, the priority of the SLSS synchronization signal sent by the vehicle-to-everything terminals B and C is the same, both are 1, but the signal strength of the vehicle-to-everything terminal B is greater than that of the vehicle-to-everything terminal C, so the SLSS synchronization signal sent by the vehicle-to-everything terminal B is selected is the optimal SLSS synchronization signal.

Operation 205: Respectively calculating synchronization errors between the optimal SLSS synchronization signal, the GNSS synchronization signal, and a synchronization clock of the vehicle-to-everything terminal to obtain two synchronization errors.

For example, through calculation, it is obtained that the synchronization error corresponding to the SLSS synchronization signal is greater than the synchronization error corresponding to the GNSS synchronization signal.

Operation 206: Detecting whether the time domain position of the smallest synchronization error among the two synchronization errors is located in the interference-free area of the cyclic prefix of the vehicle-to-everything terminal, if yes, performing operation 207, and if not, performing operation 208.

For example, it is detected whether the synchronization error corresponding to the GNSS synchronization signal is located in the interference-free area of the cyclic prefix of the vehicle-to-everything terminal A.

Operation 207: Determining the synchronization signal corresponding to the minimum synchronization error as the optimal synchronization signal.

For example, if the synchronization error corresponding to the GNSS synchronization signal is located in the non-interference area of the cyclic prefix of the vehicle-to-everything terminal A, then the GNSS synchronization signal is used as the optimal synchronization signal of the vehicle-to-everything terminal A, and there is no need to detect the optimal SLSS synchronization signal.

Operation 208: Detecting whether the time-domain position of the largest synchronization error among the two synchronization errors is located in the interference-free area of the cyclic prefix of the vehicle-to-everything terminal, if yes, performing operation 209, and if not, the synchronization fails.

For example, if the synchronization error corresponding to the GNSS synchronization signal is located outside the interference-free area of the cyclic prefix of the vehicle-to-everything terminal A, continue to detect whether the time domain position of the optimal SLSS synchronization signal is located in the interference-free area of the cyclic prefix of the vehicle-to-everything terminal A.

Operation 209: Determining the synchronization signal corresponding to the maximum synchronization error as the optimal synchronization signal.

For example, if the time domain position of the optimal SLSS synchronization signal is located in the non-interference area of the cyclic prefix of the vehicle-to-everything terminal A, then the optimal SLSS synchronization signal is used as the optimal synchronization signal of the vehicle-to-everything terminal A.

Operation 210: Performing synchronization according to the optimal synchronization signal.

For example, when the optimal synchronization signal is a GNSS synchronization signal, the vehicle-to-everything terminal A performs synchronization according to the GNSS synchronization signal. When the optimal synchronization signal is the SLSS synchronization signal, the vehicle-to-everything terminal A performs synchronization according to the SLSS synchronization signal.

Operation 211: Calibrating the crystal oscillator of the vehicle-to-everything terminal according to the optimal synchronization signal.

For example, when the optimal synchronization signal is a GNSS synchronization signal, the vehicle-to-everything terminal A calibrates the crystal oscillator according to the GNSS synchronization signal. When the optimal synchronization signal is the SLSS synchronization signal, the vehicle-to-everything terminal A calibrates the crystal oscillator according to the SLSS synchronization signal.

Operation 212: When a PSS/SSS synchronization signal is detected, performing synchronization according to the PSS/SSS synchronization signal, and calibrating the crystal oscillator of the vehicle-to-everything terminal according to the PSS/SSS synchronization signal.

For example, when the vehicle-to-everything terminal A detects the PSS/SSS synchronization signal sent by the base station E, no matter whether it detects the SLSS signal sent by other vehicle-to-everything terminals, it may synchronize according to the PSS/SSS synchronization signal. Further, the vehicle-to-everything terminal A calibrates the crystal oscillator according to the PSS/SSS synchronization signal.

Operation 213: When no synchronization signal is detected, using the crystal oscillator of the vehicle-to-everything terminal as a synchronization source to perform synchronization.

The embodiment of the present application effectively reduces the synchronization error of the vehicle-to-everything terminal and improves the clock synchronization accuracy.

According to the methods described in the above embodiments, this embodiment will be further described from the perspective of a synchronization device, and the synchronization device may be integrated into a vehicle-to-everything terminal.

Figure 6:
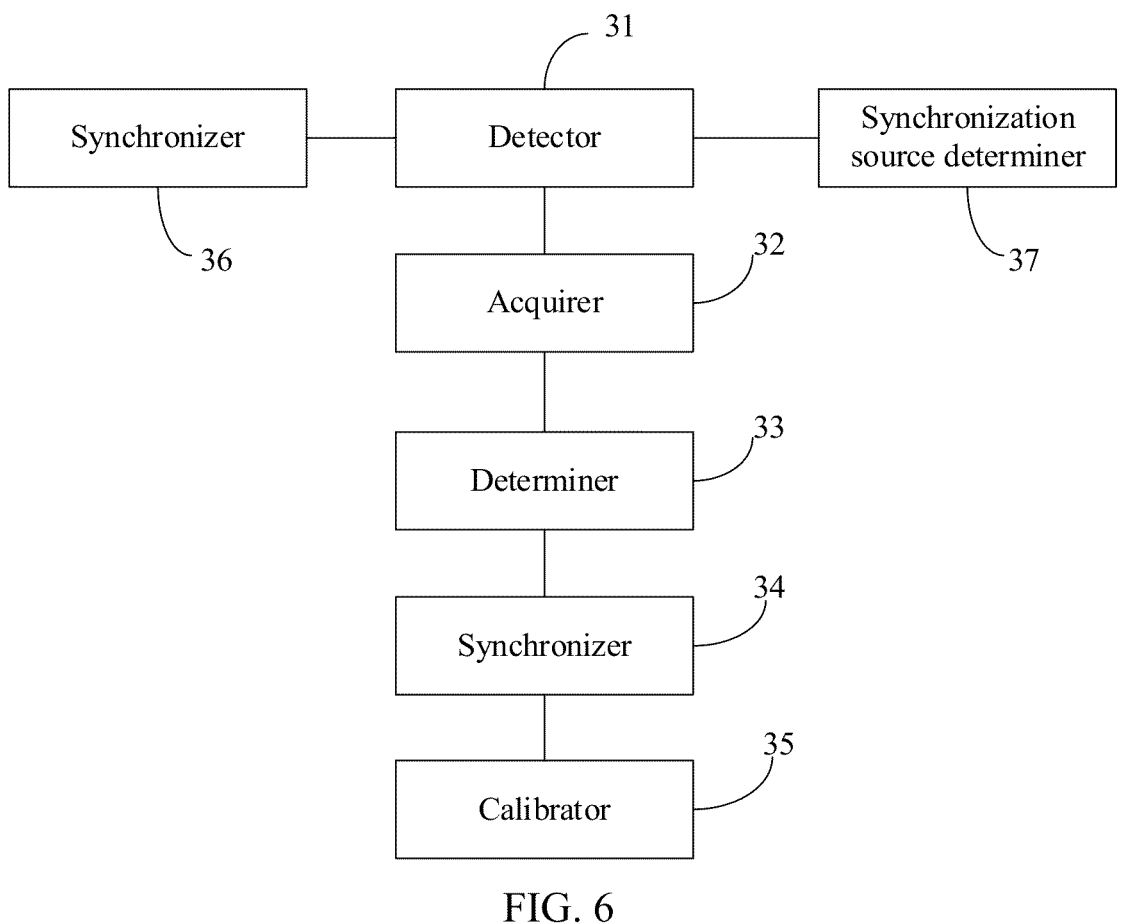
FIG. 6 is a schematic structural diagram of a synchronization device provided by an embodiment of the present application.

Referring to FIG. 6, FIG. 6 specifically describes the synchronization device provided by the embodiment of the present application. The synchronization device may include: a detector 31, an acquirer 32, a determiner 33, and a synchronizer 34.

(1) Detector 31

The detector 31 is configured to detect a synchronization signal.

In the embodiment of the present application, the vehicle-to-everything terminal detects the synchronization signals around it. If the vehicle-to-everything terminal is located within the coverage of the base station, the vehicle-to-everything terminal can detect the synchronization signal sent by the base station, and the synchronization signal sent by the base station is PSS or SSS. If the vehicle-to-everything terminal is located outside the coverage of the base station and the vehicle-to-everything terminal can detect a synchronization signal, then the synchronization signal detected by the vehicle-to-everything terminal is the SLSS sent by other vehicle-to-everything terminals. In addition, the vehicle-to-everything terminal located outside the coverage of the base station may not detect any synchronization signal.

(2) Acquirer 32

The acquirer 32 is configured to acquire a GNSS synchronization signal when at least one SLSS synchronization signal is detected.

In the embodiment of the present application, the vehicle-to-everything terminal does not detect the PSS/SSS synchronization signal sent by the base station, but only detects the SLSS synchronization signal sent by other vehicle-to-everything terminals. In order to avoid the priority value of the SLSS synchronization signal being too large, that is, the priority is too low, and the synchronization accumulation error is too large, the GNSS synchronization signal is introduced.

The GNSS module of the vehicle-to-everything terminal can receive the synchronization signal sent by GNSS, that is, the GNSS synchronization signal. That is to say, when the vehicle-to-everything terminal cannot be directly synchronized with the base station, the GNSS synchronization signal is used to select the optimal synchronization signal of the vehicle-to-everything terminal to reduce the synchronization error of the vehicle-to-everything terminal.

(3) Determiner 33

The determiner 33 is configured to perform synchronization error detection on the at least one SLSS synchronization signal and the GNSS synchronization signal, so as to determine an optimal synchronization signal.

In the embodiment of the present application, the vehicle-to-everything terminal compares and detects the SLSS synchronization signal received from other vehicle-to-everything terminals with the GNSS synchronization signal obtained from the GNSS. Synchronization signals with small synchronization errors are given priority.

(4) Synchronizer 34

The synchronizer 34 is configured to perform synchronization according to the optimal synchronization signal.

In the embodiment of the present application, synchronizing according to the optimal synchronization signal means that the vehicle-to-everything terminal adjusts its own synchronization clock to be consistent with the clock corresponding to the optimal synchronization signal.

In some embodiments of the present application, the determiner 33 is configured to:

select an optimal SLSS synchronization signal from the at least one SLSS synchronization signal; and respectively perform synchronization error detection on the optimal SLSS synchronization signal and the GNSS synchronization signal to determine the optimal synchronization signal.

In some embodiments of the present application, the determiner 33 is configured to:

select SLSS synchronization signals with a highest priority from the at least one SLSS synchronization signal; and select an SLSS synchronization signal with a highest signal strength from the SLSS synchronization signals with the highest priority as the optimal SLSS synchronization signal.

In some embodiments of the present application, the determiner 33 is configured to:

respectively calculate synchronization errors between the optimal SLSS synchronization signal, the GNSS synchronization signal, and a synchronization clock of the vehicle-to-everything terminal to obtain two synchronization errors; and detect time domain positions of the two synchronization errors to determine the optimal synchronization signal according to a detection result.

In some embodiments of the present application, the determiner 33 is configured to:

detect whether a time domain position of a minimum synchronization error between the two synchronization errors is located in an interference-free area of a cyclic prefix of a signal sent by the vehicle-to-everything terminal;

if yes, determine that the synchronization signal corresponding to the minimum synchronization error is the optimal synchronization signal;

if not, detect whether a time domain position of a maximum synchronization error between the two synchronization errors is located in the interference-free area of the cyclic prefix of the signal sent by the vehicle-to-everything terminal; and if yes, determine that the synchronization signal corresponding to the maximum synchronization error is the optimal synchronization signal.

In some embodiments of the present application, the device further includes a calibrator 35, and the calibrator 35 is configured to:

calibrate a crystal oscillator of the vehicle-to-everything terminal according to the optimal synchronization signal.

In some embodiments of the present application, the device further includes a signal synchronizer 36, and the signal synchronizer 36 is configured to:

when a PSS/SSS synchronization signal is detected, perform synchronization according to the PSS/SSS synchronization signal; and calibrate the crystal oscillator of the vehicle-to-everything terminal according to the PSS/SSS synchronization signal.

In some embodiments of the present application, the device further includes a synchronization source determiner 37, and the synchronization source determiner 37 is configured to:

when the synchronization signal is not detected, the crystal oscillator of the vehicle-to-everything terminal is used as a synchronization source to perform synchronization.

It can be seen from the above that the synchronization method provided by the present application can acquire the GNSS synchronization signal when the vehicle-to-everything terminal detects at least one SLSS synchronization signal, and the vehicle-to-everything terminal performs synchronization error detection on at least one SLSS synchronization signal and GNSS synchronization signal respectively, so as to determine an optimal synchronization signal, to synchronize according to the optimal synchronization signal to avoid accumulating synchronization errors, thereby reducing the synchronization error and improving the synchronization accuracy.

Figure 7:
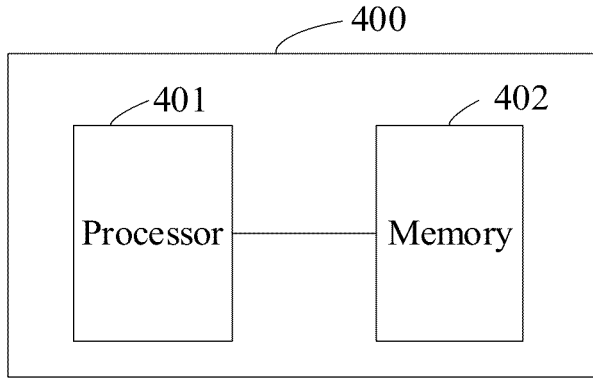
FIG. 7 is a schematic structural diagram of a vehicle-to-everything terminal provided by an embodiment of the present application.

In addition, the embodiment of the present application also provides a vehicle-to-everything terminal. As shown in FIG. 7, the vehicle-to-everything terminal 400 includes a processor 401 and a memory 402. The processor 401 is electrically connected with the memory 402.

The processor 401 is the control center of the mobile terminal 400 and uses various interfaces and lines to connect various parts of the entire vehicle-to-everything terminal. The processor 401 executes or loads the application programs stored in the memory 402 and invokes the data stored in the memory 402 to execute various functions of the vehicle-to-everything terminal and process data, so as to monitor the vehicle-to-everything terminal as a whole.

In this embodiment, the detector 31, the acquirer 32, the determiner 33, and the synchronizer 34 shown in FIG. 6 may be application programs stored in the memory 402. The processor 401 in the vehicle-to-everything terminal 400 runs the detector 31, the acquirer 32, the determiner 33, and the synchronizer 34 stored in the memory 402, so as to realize various functions. When the detector 31 is executed by the processor 401, it is used to detect the synchronization signal. When the acquirer 32 is executed by the processor 401, it is configured to obtain a GNSS synchronization signal when at least one SLSS synchronization signal is detected. When the determiner 33 is executed by the processor 401, it is configured to perform synchronization error detection on the at least one SLSS synchronization signal and the GNSS synchronization signal, so as to determine an optimal synchronization signal. When the synchronizer 34 is executed by the processor 401, it is configured to perform synchronization according to the optimal synchronization signal.

Figure 8:
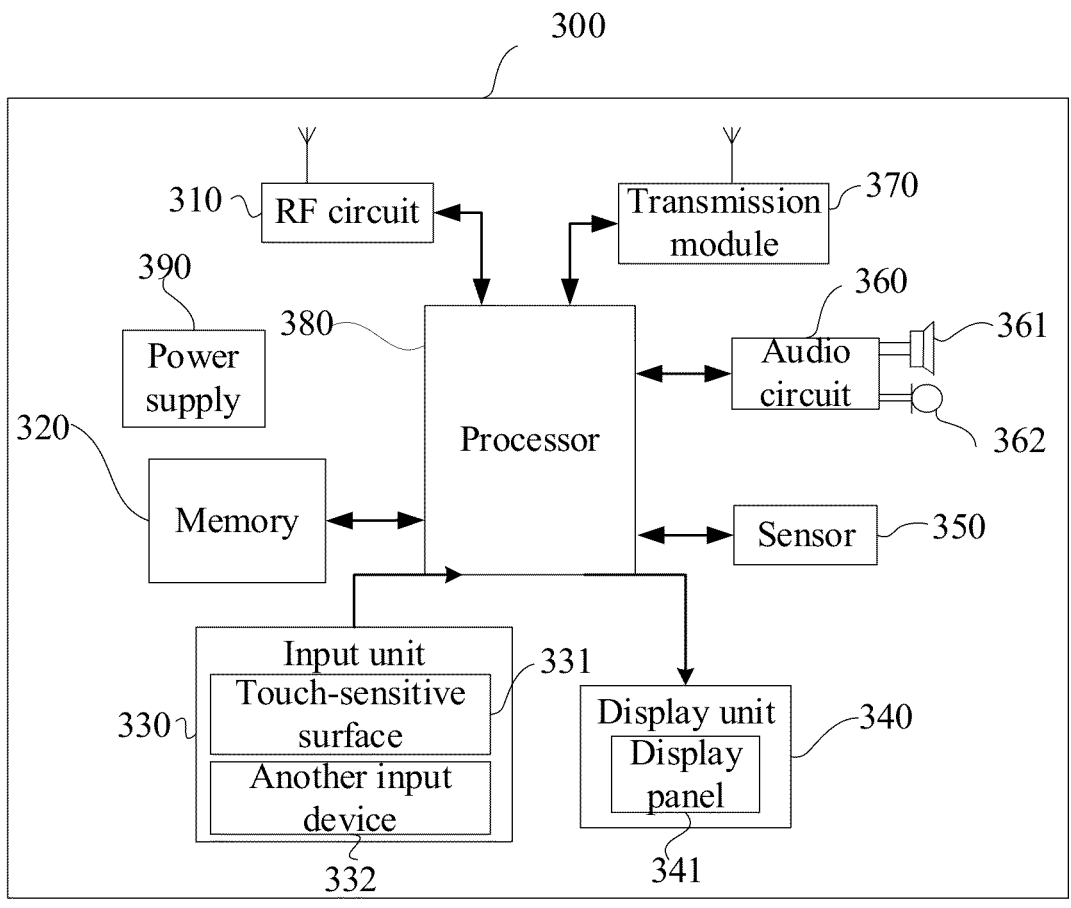
FIG. 8 is a schematic diagram of another structure of a vehicle-to-everything terminal provided by an embodiment of the present application.

Referring to FIG. 8, FIG. 8 is a schematic structural diagram of a vehicle-to-everything terminal provided by an embodiment of the present application. The vehicle-to-everything terminal 300 may include an RF circuit 310, a memory 320 including one or more computer-readable storage media, an input unit 330, a display unit 340, a sensor 350, an audio circuit 360, a speaker 361, a microphone 362, and a transmission module 370, including a processor 380 with one or more processing cores, a power supply 390 and other components. Those skilled in the art can understand that the structure of the vehicle-to-everything terminal shown in FIG. 8 does not constitute a limitation on the vehicle-to-everything terminal and may include more or less components than those shown in the figure, or combine certain components, or different components layout.

The radio frequency (RF) circuit 310 is configured to receive and transmit electromagnetic waves and realize the mutual conversion of the electromagnetic wave and the electric signal, thereby communicating with the communication network or other equipment. The RF circuit 110 may include various existing circuit elements for performing these functions, such as antennas, cellular communication radio frequency transceivers, millimeter wave radio frequency transceiver, WIFI/BT transceiver, GPS transceiver, digital signal processors, encryption/decryption chips, subscriber identity modules (SIM) cards, and memories. The RF circuit 110 may communicate with various networks such as the Internet, an intranet, a wireless network, or communicate with other devices over a wireless network. The above-mentioned wireless network may include a cellular telephone network, a wireless local area network or a metropolitan area network. The above-mentioned wireless networks may use various communication standards, protocols and techniques including, but not limited to, global system for mobile communication (GSM), enhanced data GSM environment (EDGE), wideband code division multiple access (W-CDMA), code division access (CDMA), time division multiple access (TDMA), Bluetooth, wireless fidelity (Wi-Fi) (such as American institute of electrical and electronics engineers standards IEEE 802.11a, IEEE 802.11b, IEEE802.11g and/or IEEE 802.11n), Voice over internet protocol (VOIP), worldwide interoperability for microwave access (Wi-Max), other protocols for mail, instant messaging and short messaging, as well as any other suitable communication protocols, and even those that are not yet developed.

The memory 320 may be configured to store a software instructions and module. The processor 380 runs the software instructions and module stored in the memory 320, to implement various functional applications and data processing. In addition, the memory 320 may include a high speed random access memory, and may also include a non-volatile memory, such as at least one magnetic disk memory, a flash memory device, or another volatile solid-state memory. In some examples, the memory 320 may further include a memory that is remotely located relative to the processor 380, and these remote memories may be connected to the terminal device 300 through a network. Examples of the aforementioned networks include, but are not limited to, the Internet, intranets, local area networks, mobile communication networks, and combinations thereof.

The input unit 330 can be used to receive input numbers or character information, and generate keyboard, mouse, joystick, optical or trackball signal input related to user settings and function control. Specifically, the input unit 330 may include a touch-sensitive surface 331 and other input devices 332. The touch-sensitive surface 331, also referred to as a touch screen or touchpad, can collect user touch operations on or near it (for example, the user uses any suitable object or accessory such as a finger, a stylus, etc. on the touch-sensitive surface 331 or on the operation near the touch-sensitive surface 331), and drive the corresponding connection device according to the preset program. Optionally, the touch-sensitive surface 331 may include two parts: a touch detection device and a touch controller. The touch detection device detects the orientation of the user's touch, detects the signal brought by the touch operation, and transmits the signal to the touch controller. The touch controller receives touch information from the touch detection device, converts it into contact coordinates, and then sends it to the processor 380, and can receive and execute commands sent by the processor 380. In addition, the touch-sensitive surface 331 may be implemented in various types such as resistive, capacitive, infrared, and surface acoustic wave. In addition to the touch-sensitive surface 331, the input unit 330 may also include other input devices 332. Specifically, other input devices 332 may include, but are not limited to, one or more of physical keyboards, function keys (such as volume control keys, switch keys, etc.), trackballs, mice, joysticks, and the like.

The display unit 340 may be used to display information input by or provided to the user and various graphic user interfaces of the vehicle-to-everything terminal 300. These graphical user interfaces can be composed of graphics, text, icons, videos and any combination thereof. The display unit 340 may include a display panel 341. Optionally, the display panel 341 may be configured in a form of LCD (liquid crystal display), OLED (organic light-emitting diode), or the like. Further, the touch-sensitive surface 331 can cover the display panel 341. When the touch-sensitive surface 331 detects a touch operation on or near it, it transmits to the processor 380 to determine the type of the touch event. Then the processor 380 provides corresponding visual output on the display panel 341 according to the type of the touch event. Although in FIG. 8, the touch-sensitive surface 331 and the display panel 341 are used as two independent components to realize input and output functions, in some embodiments, the touch-sensitive surface 331 and the display panel 341 can be integrated to realize input, and output functions.

The vehicle-to-everything terminal 300 may further include at least one sensor 350, such as a light sensor, a motion sensor and other sensors. Specifically, the light sensor may include an ambient light sensor and a proximity sensor. The ambient light sensor can adjust the brightness of the display panel 341 according to the brightness of the ambient light. The proximity sensor can turn off the display panel 341 and/or the backlight when the vehicle-to-everything terminal 300 is moved to the ear. As a kind of motion sensor, the gravity acceleration sensor can detect the magnitude of acceleration in all directions (generally three axes). The gravity acceleration sensor can detect the magnitude and direction of gravity when it is stationary and can be used to identify terminal posture applications (such as horizontal and vertical screen switching, related games, magnetometer posture calibration), vibration recognition related functions (such as pedometer, tapping), etc. As for other sensors such as gyroscopes, barometers, hygrometers, thermometers, and infrared sensors that can be configured on the vehicle-to-everything terminal 300, details will not be repeated here.

Audio circuit 360, speaker 361, and microphone 362 are disclosed. The microphone 362 can provide an audio interface between the user and the vehicle-to-everything terminal 300. The audio circuit 360 can transmit the electrical signal converted from the received audio data to the speaker 361, and the speaker 361 converts it into an audio signal for output. On the other hand, the microphone 362 converts the collected sound signal into an electrical signal, which is converted into audio data after being received by the audio circuit 360, and then processed by the audio data output processor 380, and then sent to another terminal such as through the RF circuit 310, alternatively the audio data is output to memory 320 for further processing. The audio circuit 360 may also include an earplug jack to provide communication between an external earphone and the vehicle-to-everything terminal 300.

The vehicle-to-everything terminal 300 can help users send and receive emails, browse webpages, and access streaming media through a transmission module 370 (e.g., a WIFI module). It provides users with wireless broadband Internet access. Although FIG. 8 shows the transmission module 370, it can be understood that it is not a necessary component of the vehicle-to-everything terminal 300 and can be completely omitted as required without changing the essence of the invention.

The processor 380 is the control center of the terminal 300 and uses various interfaces and lines to connect various parts of the entire terminal. The processor 380 runs or executes software programs and/or modules stored in the memory 320, and invokes data stored in the memory 320 to execute various functions and process data of the vehicle-to-everything terminal 300, so as to monitor the terminal as a whole. Optionally, the processor 380 may include one or more processing cores. In some embodiments, processor 380 may integrate an application processor and a modem processor. The application processor mainly handles the operating system, user interface and application programs, etc., and the modem processor mainly handles wireless communication. It can be understood that the foregoing modem processor may not be integrated into the processor 380.

The vehicle-to-everything terminal 300 also includes a power supply 390 (such as a battery) for supplying power to various components. In some embodiments, the power supply can be logically connected to the processor 380 through a power management system, so that functions such as charging, discharging, and power consumption management can be implemented through the power management system. The power supply 390 may also include one or more DC or AC power supplies, recharging systems, power failure detection circuits, power converters or inverters, power status indicators, and other arbitrary components.

Although not shown, the vehicle-to-everything terminal 300 may also include a camera (such as a front camera, a rear camera), a Bluetooth module, etc., which will not be repeated here. Specifically, in this embodiment, the display unit of the vehicle-to-everything terminal is a touch screen display. The vehicle-to-everything terminal also includes a memory 320. The detector 31, the acquirer 32, the determiner 33, and the synchronizer 34 shown in FIG. 6 may be application programs stored in the memory 320. The processor 380 in the vehicle-to-everything terminal 300 runs the detector 31, the acquirer 32, the determiner 33, and the synchronizer 34 stored in the memory 320, so as to realize various functions. When the detector 31 is executed by the processor 380, it is used for detecting the synchronization signal. When the acquirer 32 is executed by the processor 380, it is configured to obtain a GNSS synchronization signal when at least one SLSS synchronization signal is detected. When the determiner 33 is executed by the processor 380, it is configured to perform synchronization error detection on the at least one SLSS synchronization signal and the GNSS synchronization signal, so as to determine an optimal synchronization signal. When the synchronizer 34 is executed by the processor 380, it is used for performing synchronization according to the optimal synchronization signal.

During specific implementation, each of the above modules may be implemented as an independent entity or may be combined arbitrarily to be implemented as the same or several entities. For the specific implementation of the above modules, reference may be made to the foregoing method embodiments, and details are not repeated here.

Those skilled in the art can understand that all or part of the steps in the various methods of the above embodiments can be completed by instructions, or by instructions controlling related hardware. The instructions can be stored in a computer-readable storage medium and loaded and executed by a processor. To this end, an embodiment of the present invention provides a storage medium in which a plurality of instructions are stored, and the instructions can be loaded by a processor to execute the steps in any synchronization method provided by the embodiments of the present invention.

The storage medium may include: a read only memory (ROM), a random access memory (RAM), a magnetic disk or an optical disk, and the like.

The instructions stored in the storage medium can execute the steps in any synchronization method provided by the embodiments of the present invention. Therefore, the beneficial effects that can be achieved by any synchronization method provided by the embodiments of the present invention can be realized. See the previous embodiments for details, and details are not repeated here.

For the specific implementation of the above operations, reference may be made to the foregoing embodiments, and details are not repeated here.

In summary, although the present application has disclosed the above with preferred embodiments, the above preferred embodiments are not intended to limit the present application. Those skilled in the art can make various changes and modifications without departing from the spirit and scope of the present application. Therefore, the protection scope of the present application is subject to the scope defined by the claims.

What is claimed is:

1. A synchronization method applied to a vehicle-to-everything terminal, comprising:

detecting a synchronization signal;

when at least one SLSS synchronization signal is detected, obtaining a Global Navigation Satellite System (GNSS) synchronization signal;

respectively performing synchronization error detection on the at least one Sidelink Synchronization Signal (SLSS) synchronization signal and the GNSS synchronization signal to determine an optimal synchronization signal; and performing synchronization according to the optimal synchronization signal;

wherein respectively performing synchronization error detection on the at least one SLSS synchronization signal and the GNSS synchronization signal to determine the optimal synchronization signal further comprises:

selecting an optimal SLSS synchronization signal from the at least one SLSS synchronization signal; and respectively performing synchronization error detection on the optimal SLSS synchronization signal and the GNSS synchronization signal to determine the optimal synchronization signal;

wherein respectively performing synchronization error detection on the optimal SLSS synchronization signal and the GNSS synchronization signal to determine the optimal synchronization signal further comprises:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result;

wherein detecting the time domain positions of the two synchronization errors to determine the optimal synchronization signal according to the detection result further comprises:

detecting whether a time domain position of a minimum synchronization error between the two synchronization errors is located in an interference-free area of a cyclic prefix of a signal sent by the vehicle-to-everything terminal:

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

2. The synchronization method of claim 1, further comprising:

calibrating a crystal oscillator of the vehicle-to-everything terminal according to the optimal synchronization signal.

3. The synchronization method of claim 1, further comprising:

when a Primary synchronization signal (PSS)/Secondary synchronization signal (SSS) synchronization signal is detected, performing synchronization according to the PSS/SSS synchronization signal; and calibrating the crystal oscillator of the vehicle-to-everything terminal according to the PSS/SSS synchronization signal.

4. The synchronization method of claim 1, further comprising:

when the synchronization signal is not detected, the crystal oscillator of the vehicle-to-everything terminal is used as a synchronization source to perform synchronization.

5. The synchronization method of claim 1, wherein selecting the optimal SLSS synchronization signal from the at least one SLSS synchronization signal further comprises:

selecting SLSS synchronization signals with a highest priority from the at least one SLSS synchronization signal; and selecting an SLSS synchronization signal with a highest signal strength from the SLSS synchronization signals with the highest priority as the optimal SLSS synchronization signal.

6. A non-transitory computer-readable storage medium, wherein a plurality of instructions are stored in the computer-readable storage medium, and the instructions are configured to be loaded by a processor to perform the following steps:

detecting a synchronization signal;

when at least one SLSS synchronization signal is detected, obtaining a Global Navigation Satellite System (GNSS) synchronization signal;

respectively performing synchronization error detection on the at least one Sidelink Synchronization Signal (SLSS) synchronization signal and the GNSS synchronization signal to determine an optimal synchronization signal; and performing synchronization according to the optimal synchronization signal;

wherein the processor respectively performing synchronization error detection on the at least one SLSS synchronization signal and the GNSS synchronization signal to determine the optimal synchronization signal further comprises the following steps:

selecting an optimal SLSS synchronization signal from the at least one SLSS synchronization signal; and respectively performing synchronization error detection on the optimal SLSS synchronization signal and the GNSS synchronization signal to determine the optimal synchronization signal;

wherein the processor respectively performing synchronization error detection on the optimal SLSS synchronization signal and the GNSS synchronization signal to determine the optimal synchronization signal further comprises the following steps:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result;

wherein the processor detecting the time domain positions of the two synchronization errors to determine the optimal synchronization signal according to the detection result further comprises the following steps:

detecting whether a time domain position of a minimum synchronization error between the two synchronization errors is located in an interference-free area of a cyclic prefix of a signal sent by the vehicle-to-everything terminal;

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

7. The non-transitory computer-readable storage medium of claim 6, wherein the processor further performs the following steps:

calibrating a crystal oscillator of the vehicle-to-everything terminal according to the optimal synchronization signal.

8. The non-transitory computer-readable storage medium of claim 6, wherein the processor further performs the following steps:

when a Primary synchronization signal (PSS)/Secondary synchronization signal (SSS) synchronization signal is detected, performing synchronization according to the PSS/SSS synchronization signal; and calibrating the crystal oscillator of the vehicle-to-everything terminal according to the PSS/SSS synchronization signal.

9. The non-transitory computer-readable storage medium of claim 6, wherein the processor further performs the following steps:

when the synchronization signal is not detected, the crystal oscillator of the vehicle-to-everything terminal is used as a synchronization source to perform synchronization.

10. The non-transitory computer-readable storage medium of claim 6, wherein the processor selecting the optimal SLSS synchronization signal from the at least one SLSS synchronization signal further comprises the following steps:

selecting SLSS synchronization signals with a highest priority from the at least one SLSS synchronization signal; and selecting an SLSS synchronization signal with a highest signal strength from the SLSS synchronization signals with the highest priority as the optimal SLSS synchronization signal.

11. A vehicle-to-everything terminal comprising: a processor and a memory, wherein the processor is electrically connected to the memory, the memory is used to store instructions and data, and the processor is used to perform the following steps:

detecting a synchronization signal;

when at least one Sidelink Synchronization Signal (SLSS) synchronization signal is detected, obtaining a Global Navigation Satellite System (GNSS) synchronization signal;

respectively performing synchronization error detection on the at least one SLSS synchronization signal and the GNSS synchronization signal to determine an optimal synchronization signal; and performing synchronization according to the optimal synchronization signal;

wherein the processor respectively performing synchronization error detection on the at least one SLSS synchronization signal and the GNSS synchronization signal to determine the optimal synchronization signal further comprises the following steps:

selecting an optimal SLSS synchronization signal from the at least one SLSS synchronization signal; and respectively performing synchronization error detection on the optimal SLSS synchronization signal and the GNSS synchronization signal to determine the optimal synchronization signal;

wherein the processor respectively performing synchronization error detection on the optimal SLSS synchronization signal and the GNSS synchronization signal to determine the optimal synchronization signal further comprises the following steps:

respectively calculating synchronization errors between the optimal SLSS synchronization signal, the GNSS synchronization signal, and a synchronization clock of the vehicle-to-everything terminal to obtain two synchronization errors; and detecting time domain positions of the two synchronization errors to determine the optimal synchronization signal according to a detection result;

wherein the processor detecting the time domain positions of the two synchronization errors to determine the optimal synchronization signal according to the detection result further comprises the following steps:

detecting whether a time domain position of a minimum synchronization error between the two synchronization errors is located in an interference-free area of a cyclic prefix of a signal sent by the vehicle-to-everything terminal;

if yes, determining that the synchronization signal corresponding to the minimum synchronization error is the optimal synchronization signal;

if not, detecting whether a time domain position of a maximum synchronization error between the two synchronization errors is located in the interference-free area of the cyclic prefix of the signal sent by the vehicle-to-everything terminal; and if yes, determining that the synchronization signal corresponding to the maximum synchronization error is the optimal synchronization signal.

* * * * *